United States Patent
Magonski et al.

(10) Patent No.: US 8,968,959 B2
(45) Date of Patent: Mar. 3, 2015

(54) METHOD FOR FABRICATION OF ELECTROCHEMICAL ENERGY CONVERTER AND THE ELECTROCHEMICAL ENERGY CONVERTER

(75) Inventors: Zbigniew Magonski, Cracow (PL); Barbara Dziurdzia, Cracow (PL)

(73) Assignee: Akademia Gorniczo-Hutnicza Im. Stanislawa Staszica, Cracow (PL)

( * ) Notice: Subject to any disclaimer, the term of this patent is extended or adjusted under 35 U.S.C. 154(b) by 518 days.

(21) Appl. No.: 13/382,287

(22) PCT Filed: Jul. 12, 2010

(86) PCT No.: PCT/PL2010/000058
§ 371 (c)(1),
(2), (4) Date: Jan. 4, 2012

(87) PCT Pub. No.: WO2011/008116
PCT Pub. Date: Jan. 20, 2011

(65) Prior Publication Data
US 2012/0107717 A1    May 3, 2012

(30) Foreign Application Priority Data
Jul. 17, 2009  (PL) .......................... 388558

(51) Int. Cl.
*H01M 8/12*        (2006.01)
*B05D 3/12*        (2006.01)
(Continued)

(52) U.S. Cl.
CPC .......... *H01M 8/0236* (2013.01); *H01M 4/8621* (2013.01); *H01M 4/8803* (2013.01);
(Continued)

(58) Field of Classification Search
CPC .......................... H01M 8/0258; H01M 4/8885

USPC .................................................. 429/480, 479
See application file for complete search history.

(56) References Cited

U.S. PATENT DOCUMENTS 5,169,731 A * 12/1992 Yoshimura et al. ........... 429/465
2004/0076867 A1* 4/2004 Day et al. ....................... 429/32
(Continued)

FOREIGN PATENT DOCUMENTS

EP    0 499 935 A1    8/1992
EP    1 246 288 A1    10/2002

OTHER PUBLICATIONS

Shi et al., NiO nanotubes assembled in pores of porous anodic alumina and their optical absorption propertes, Chemical Physics Letters, vol. 454, pp. 75-79, Elsevier 2008.*
(Continued)

*Primary Examiner* — Milton I Cano
*Assistant Examiner* — Brent Thomas
(74) *Attorney, Agent, or Firm* — Matthias Scholl, PC; Matthias Scholl

(57) ABSTRACT

In a method for fabrication of an electrochemical energy converter, cermet composition layers (2A), (2B) are applied on both sides of a central ceramic plate (1), channels (3A), (3B) are made in the cermet composition layers (2A), (2B), then the channels (3A), (3B) on both sides of the plate are covered with cermet composition layers (4A), (4B). Afterwards, both sides of the ceramic structure are overlaid with conductive structures (5A), (5B) and then with subsequent layers of the cermet composition (6A), (6B) containing nickel, then both sides of the ceramic structure are overlaid with: layers constituting the solid electrolyte (7A), (7B), layers constituting electrodes (8A), (8B) and contact layers (9A), (9B).

8 Claims, 4 Drawing Sheets

Figure 1:
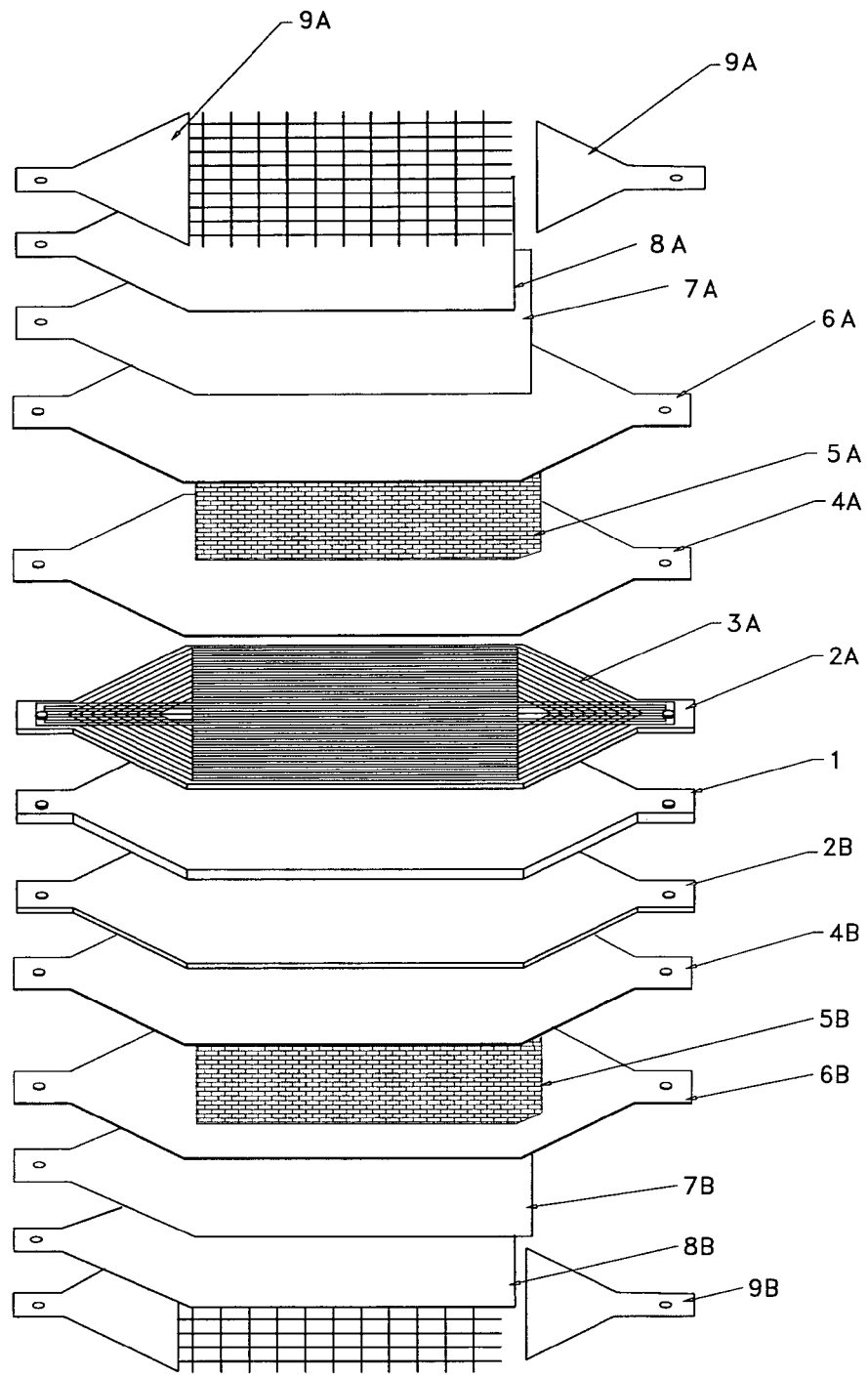

(51) Int. Cl.
    *B05D 5/12*     (2006.01)
    *B05D 3/06*     (2006.01)
    *B82Y 99/00*     (2011.01)
    *H01M 8/02*     (2006.01)
    *H01M 4/86*     (2006.01)
    *H01M 4/88*     (2006.01)
    *H01M 8/24*     (2006.01)

(52) U.S. Cl.
    CPC .......... *H01M4/8817* (2013.01); *H01M 4/8875* (2013.01); *H01M 4/8885* (2013.01); *H01M 8/0258* (2013.01); *H01M 8/1226* (2013.01); *H01M 8/2425* (2013.01); *H01M 2008/1293* (2013.01); *Y02E 60/521* (2013.01); *Y02E 60/525* (2013.01)

USPC .......................................... 429/480; 429/479

(56) References Cited

U.S. PATENT DOCUMENTS

| | | | |
|---|---|---|---|
| 2005/0095479 A1* | 5/2005 | Mardilovich et al. | 429/30 |
| 2006/0147778 A1 | 7/2006 | Matsuzaki et al. | |
| 2009/0081363 A1* | 3/2009 | Lobovsky et al. | 427/193 |

OTHER PUBLICATIONS

Chunsheng Shi et al., NiO nanotubes assembled in pores of porous anodic alumina and their optical absorption properties, Chemical Physics Letters, Jan. 31, 2008, 75-79, 454 (2008), Elsevier B.V., The Netherlands.

* cited by examiner

METHOD FOR FABRICATION OF ELECTROCHEMICAL ENERGY CONVERTER AND THE ELECTROCHEMICAL ENERGY CONVERTER

The invention relates to the method for fabrication of an electrochemical energy converter and the electrochemical energy converter which is intended for converting chemical energy into electrical energy. The ceramic structure of the electrochemical energy converter can be also used for production of hydrogen.

High-temperature fuel cells provide high efficiency in the process of converting chemical energy into electrical energy. These converters have an advantage of working silently without mechanical vibrations and offer a very favourable ratio of the device weight and its dimensions to the generated electric power value. Electrochemical converters have a minimum impact on the degradation of the natural environment. A typical high-temperature fuel cell contains a solid electrolyte, usually made on the basis of yttrium stabilised zirconia. The solid electrolyte is covered on both sides with electrodes which are transparent for gases. At high temperature the zirconium ceramics exhibits strong ionic conductivity. Since only the oxygen ions can move through the ceramic layer, the electrolyte is polarised due to oxygen pressure drop across the electrolyte. One of the electrolyte surfaces will be positively polarized, whereas on the opposite electrolyte surface free electrons will be released as a result of the reaction between oxygen ions and the fuel, namely hydrogen or carbon monoxide, which will cause its negative polarization. Connecting an external electrical circuit to electrodes will cause the current flow which will compensate the internal ionic current. Due to specific operation conditions, electrodes should show good electrical conductivity, transparency for gases, resistance to high temperature (about 800° C.), and resistance to sudden changes of temperature. It is of paramount importance to ensure and maintain free of leaks fuel distribution channels, because the combustion process other than electrochemical one leads to catastrophic damage of the current generator. Problems related to maintaining tightness have been resolved in the best way in electrolytic current generators featuring a tubular structure.

An example of such embodiment is revealed in the American patent description no. U.S. Pat. No. 4,395,468 in which stabilized zirconium ceramics constituting electrolyte in the form of a thin layer is applied on a tubular ceramic supporting structure. This structure has several valuable advantages such as: easy provision of electrical connections between cells of low resistance, facilitated provision of air heaters. However, the most valuable advantage of this solution is that the extended tubular ceramic supporting structure can be sealed far beyond the electrochemical combustion zone, which is the low temperature zone. It ensures a convenient conditions for completing free of leaks connections in the fuel pathway. The tubular structure fits high power generators but, in case of small generators, the ratio of the generated electrical power to a volume unit is not favourable.

There are plate structures of converters of chemical energy to electric energy, known from the American patent descriptions no. U.S. Pat. No. 4,276,355 and U.S. Pat. No. 7,531,053, which contain many electrically connected fuel cells. The fuel cells are arranged in a pile wherein every ceramic structure of a cell is placed between two plates. Each plate constitutes a separator between subsequent ceramic structures and is provided with open longitudinal channels on both sides to transmit fuel and air, wherein fuel transmission channels are positioned in an orthogonal position against the air transmission channels. Separators presented in the description U.S. Pat. No. 7,531,053 are made of stainless steel featuring the linear thermal expansion coefficient close to the linear thermal expansion coefficient of the electrolyte.

The plate structure provides the highest values of the generated power per a volume unit of the set. However, considering the thin and fragile structure of the electrolyte, it is sensitive to temperature shocks, and requires the use of special gaskets, which are resistant to high temperatures.

There is a fuel cell, known from the American patent description no. U.S. Pat. No. 6,969,565, in which every cell has been made on the temporary silicon base plate on which thin electrode layers and an electrolyte layer have been deposited by means of vacuum technologies. Then, longitudinal holes were made in the silicon base plate by means of photolithographic methods. The holes serve as channels designed to distribute fuel and oxidant. As a result of cutting out the mentioned holes, the function of the supporting structure has been taken over by the electrolyte layer. After compatible electrode layers have been deposited on the remaining silicon elements, the cells are arranged in a pile and bonded in a single sintering process. The structure is designed in such a way, that in the sintering process the layers of identical material are bonded, ensuring high degree of repeatability, resistance to sudden changes of temperature and reliability.

There is a fuel cell known from the American patent description no. U.S. Pat. No. 7,553,579 which features increased resistance to sudden changes of temperature and mechanical vibrations. The cell fitting contains both ceramic elements and metal elements attached on both sides by means of an upper flexible element and a lower flexible element. Both flexible elements determine the position of the central fuel cell socket, the position of the fuel supply channel, the position of the air supply channel, and the position of the collector, which takes off the combustion products. The cell ceramic structure is held inside a metal frame by means of additional flexible elements in such a way that it is not in direct contact with the metal frame. Moreover, the metal frame is placed between the upper and the lower flexible element which act as gaskets and elements determining the position of electrodes. The cell ceramic structure is connected to the electrodes by means of a porous nickel foam, transparent for gases. The applied metal-ceramic fitting serves as a protective shield and provides flexible suspension of the fragile cell structure. It enables also convenient conditions for connecting cells into piles.

The electrochemical energy converter according to the invention has favourable features of a tubular structure, and a favourable ratio of generated power to the unit of volume.

The method for fabrication of the electrochemical energy converter according to the invention consists in that ceramic cermet compositions, in which channels are formed, are deposited on both sides of the flat central ceramic plate. Then, the channels on both sides are covered with cermet layers containing nickel, and next the layers are fired in such a way that analogous ceramic layers on both sides are fired simultaneously. Then both sides of the ceramic structure are subsequently covered with: layers constituting solid electrolyte, layers constituting electrodes and contact layers. Further, electrical outputs are connected to contact layers.

The channels in the electrochemical energy converter can be made in one of the ways mentioned below. In the first embodiment of the electrochemical energy converter, the channels in the ceramic structure are made in one of the machining methods, such as milling before the firing process or processing with ultrasounds after the firing process. In the second embodiment of the electrochemical energy converter, the channels in the ceramic structure are made by means of the laser ablation method. In the third embodiment of the electrochemical energy converter, the channels in the ceramic structure are made by means of the moulding method, after prior placement of the central ceramic plate in the mould. In the fourth embodiment of the electrochemical energy converter, the channels in the ceramic structure are made with the photoforming process, based on the ceramic compositions suitable for photo-processing.

The electrochemical energy converter according to the embodiment has a flat multilayered ceramic structure whose core is constituted by the central ceramic plate, featuring high density and rigidity, permanently bonded with two side porous cermet layers in which the fuel distribution channels 3A, 3B have been made. The ceramic base, made in such a way, has on a part of its surface, on both sides, ceramic layers of solid electrolyte which have been overlaid, and permanently bonded with the base, and which in turn are covered on a part of their surface with electrode layers which are transparent for gases, conduct electric current, and are covered on a part of their surface with contact layers. Moreover, the electrochemical energy converter has metallic conductive structures advantageously buried in porous cermet layers, wherein the buried metallic conductive structures can be made of on the basis: transparent for gases platinum layers, nickel nanotubes or nickel meshes.

The solution according to the invention enables easy connection of cells into batteries. Thanks to the flat structure, it is possible to achieve a high degree of compactness, which in turn makes a favourable ratio of power to volume possible. Connections designed for the fuel pathways, which are remote from the high temperature zone, as well as the remote electric connections, can operate at temperatures well below the cell operation temperature. Thanks to this, the processes of degradation of the fuel transfer connections and electrical connections have been minimised, which should result in prolonged time of operation.

The relatively low temperature in the vicinity of connections for the fuel pathways makes it possible to use low-melting metal sealing or cheap polymer seals. The connections made with low-melting binders can be disassembled relatively easily. This advantage makes it possible to disconnect a selected cell, and hence to repair the battery.

Figure 2:
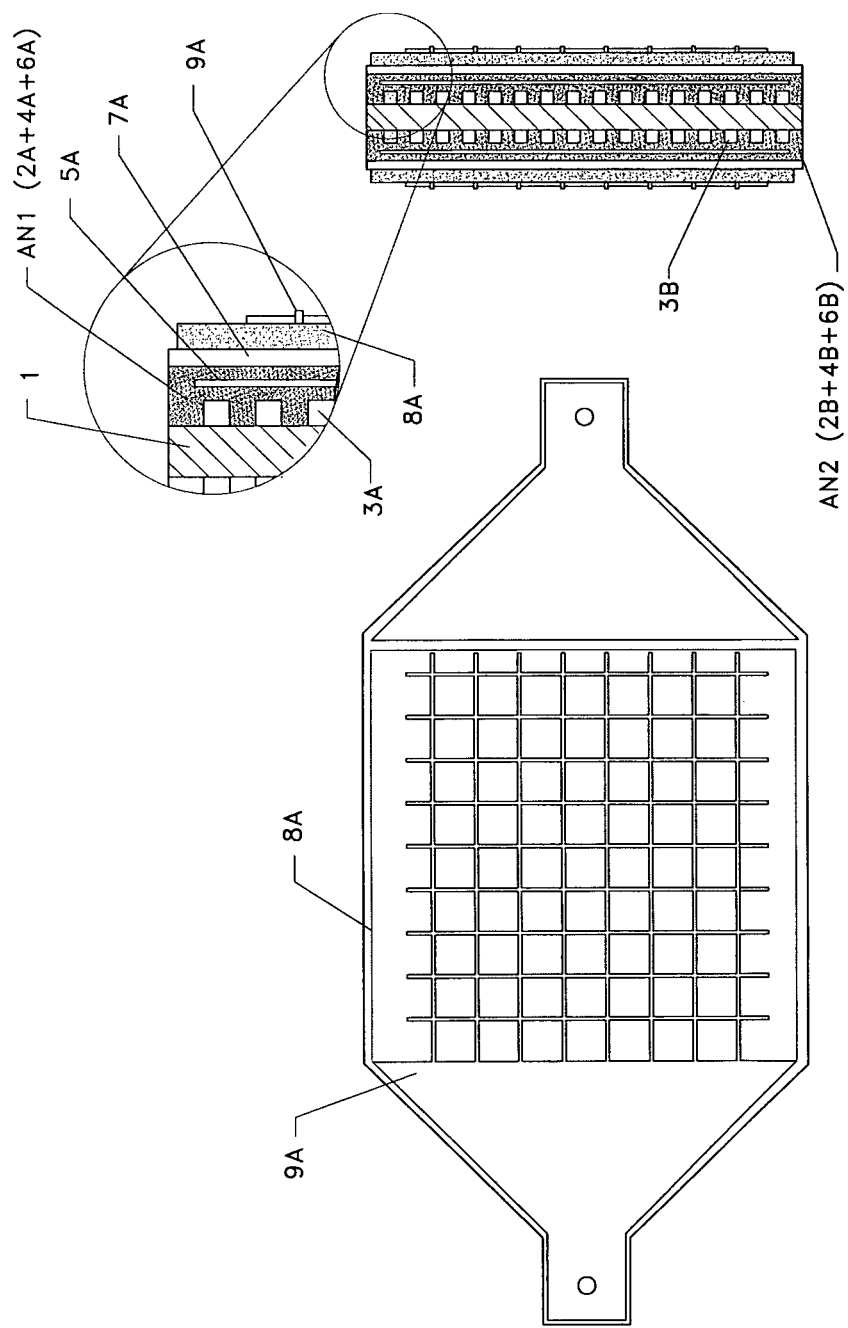
Figure 3:
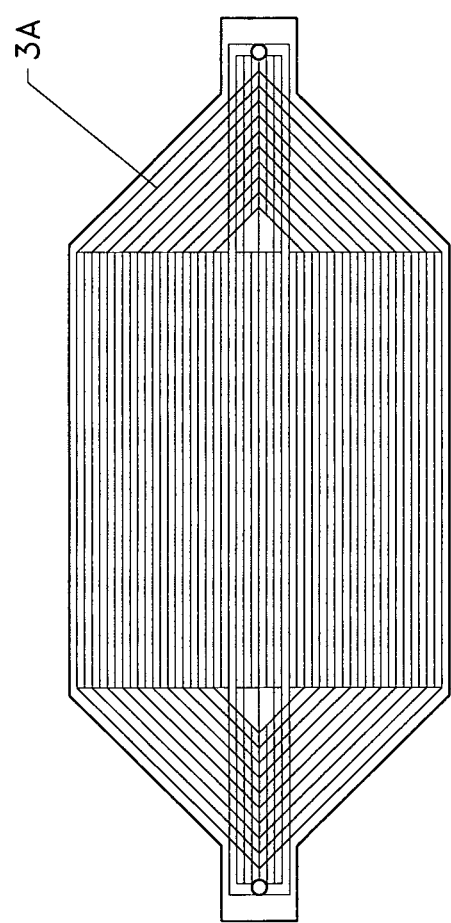
Figure 4:
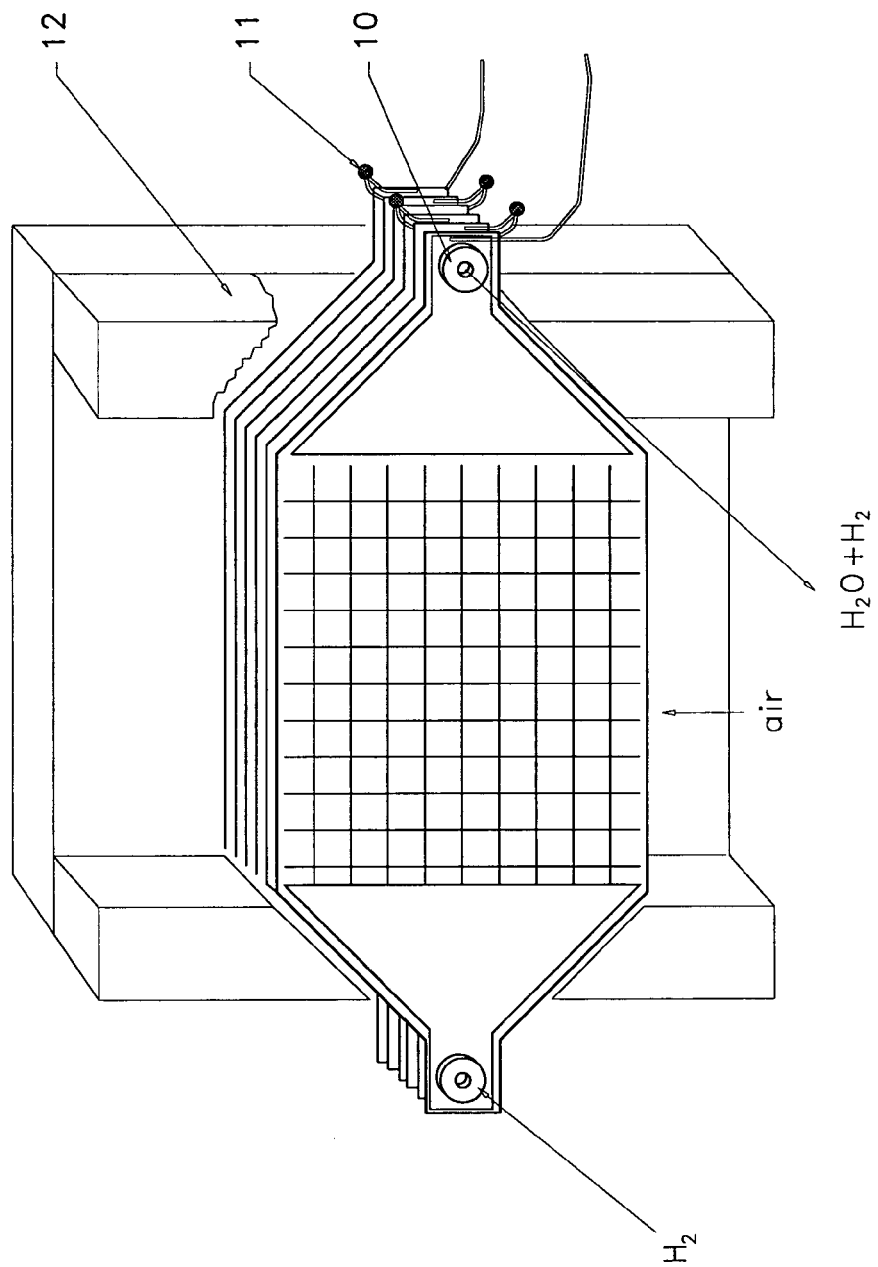

The solution according to the invention has been disclosed in the example of an embodiment in a figure, where FIG. 1 presents a sequence of layers of an integrated double cell of the electrochemical energy converter, FIG. 2 presents a general view of the integrated double cell converter and a cross section in which the location of the buried conductive structure is shown, FIG. 3 presents the arrangement of channels in the cell ceramic structure according to the invention, FIG. 4 presents the current generator, implemented on the basis of a battery of energy converters according to the invention.

EXEMPLARY EMBODIMENTS

An embodiment of a single converter cell comprises:
preparation of the ceramic base plate, which includes cutting out the pre-set shape and holes,
deposition, on both sides of the ceramic base plate, layers of a ceramic composition made on the basis of yttrium stabilized zirconia containing nickel oxide; 2× ceramic foil, 100 μm thick.
thermal processing, 200° C.-1 hour.
forming channels in the structure on both sides of the ceramic base plate by means of a micro CNC machine.
firing the ceramic structure; phase I: 450° C.-1 hour; phase II: 1520° C.-2 hours.
deposition, on both sides of the ceramic structure, the ceramic foil (100 μm) made on the basis of yttrium stabilized zirconia containing nickel oxide.
firing the ceramic structure; phase I: 450° C.-1 hour; phase II: 1520° C.-2 hours.
deposition of the metallic conductive structure in the form of platinum strips of the width of 100 μm on both sides of the ceramic structure,
firing the metallic conductive structures, 950° C.-1 hour.
deposition, on both sides of the ceramic structure, the ceramic foil (100 μm) made on the basis of yttrium stabilized zirconia containing nickel oxide.
firing the ceramic structure; phase I: 450° C.-1 hour; phase II: 1520° C.-2 hours,
deposition of two layers of the electrolyte ceramic composition based on yttrium stabilized zirconia by means of the screen printing method on each side of the ceramic structure,
firing the ceramic structure; phase I: 450° C.-1 hour; phase II: 1520° C.-2 hours,
deposition of layers of conductive ceramic composition made on the basis of $(La,Sr)MNO_3$ on both sides of the ceramic structure by means of the screen printing method,
firing the ceramic structure, 950° C.-1 hour,
sealing the edge of the ceramic structure (C-129 glass, ESL),
deposition of contact layers on both sides of the ceramic structure by means of the screen printing method, (Au paste),
firing the ceramic structure, 950° C.-0.5 hour,
attaching outputs to contacts (Au wire, 0.3 mm),
reduction of nickel oxide in the porous cermet layers, temp. 850° C., $N_2+H_2$, An example of an embodiment of the electrochemical energy converter.

The electrochemical energy converter has a flat multilayered ceramic structure whose core is the central ceramic plate 1 featuring high density and rigidity, permanently bonded to porous cermet layers AN1, AN2, in which the fuel distribution channels 3A, 3B have been formed. A ceramic structure, is made in such a way, that it has deposited on parts of its both surfaces ceramic layers of solid electrolyte 7A, 7B, which have been permanently bonded with the ceramic structure, and which on a part of their surface are covered with electrode layers 8A, 8B that in turn are transparent for gases, conduct electric current and are covered on a part of their surface with contact layers 9A, 9B.

The metallic conductive structures 5A, 5B, buried in the porous cermet layers AN1, AN2, have an advantageous influence on the electric, catalytic, thermal, and mechanical properties of the layers which constitute cell anodes. The application of the buried layer implemented on the basis of properly oriented nickel nanotubes is particularly advantageous. This material, due to its large active surface, seems to be the best of all catalytic materials which have been known for this application. High thermal conductivity of the nanotubes ensures uniform temperature of the cell in its whole active area, which not only minimises the mechanical stress, but also ensures optimum load of the active electrolytic layer. High electrical conductivity of the nanotubes is of special importance, particularly for this structure, because it reduces resistance between the electrolyte and the output contacts.

The ceramic structure made in such a way contains two independent current generators which can be connected, wherein the connection can be parallel or serial. The combined structures are connected into batteries by means of metallic separators 10.

In the embodiment according to the invention, two types of connections were used. Within the ceramic structure, which is a rigid and indivisible element, the tightness of the channels distributing fuel and products of combustion is ensured by sintered ceramic connections of materials of identical structure. The gas connections between the cells were made by means of metal joints featuring some flexibility. The metallic separators 10 made of a soft material perform at the same time the function of connectors and seals. FIG. 4 presents an electrochemical current generator in which a battery of converters according to the invention has been used. The battery of converters is located in a chamber made of insulation material 12 through which air is blown. The design of the energy converter makes it possible to implement electrical connections and gas connections beyond the chamber which allows to maintain these connections in more advantageous operation conditions. Considering the fact that the mentioned connections operate in much lower temperature, it is possible to use low-melting binders which in turn facilitates the exchange of a single cell in case of damage. The cell design makes it also possible to implement electrical connections by means of welded wire connections 11.

The ceramic structure of the electrochemical energy converter according to the invention can be also employed in devices intended for production of hydrogen.

The invention claimed is:

1. A method for fabrication of an electrochemical energy converter, the method comprising deposing subsequent layers, wherein two sides of a central ceramic plate featuring high density and rigidity are covered with first cermet composition layers, in which, on the two sides of the central ceramic plate, channels are made, then the channels on the two sides of the central ceramic plate are covered with second cermet composition layers containing nickel, which are next fired in such a way, that analogous ceramic layers on the two sides are fired simultaneously to form a ceramic structure; then both sides of the ceramic structure are overlaid with conductive structures, and afterwards with third cermet composition layers containing nickel, then both sides of the ceramic structure are overlaid with: layers constituting the solid electrolyte layers which are transparent for gases and conduct electric current, constituting electrodes and contact layers, and afterwards electrical outputs are connected to the contact layers.

2. The method of claim 1, wherein the channels are made by means of a mold casting method wherein a central ceramic plate has been earlier placed in the mold.

3. The method of claim 1, wherein the channels are made by means of machining.

4. The method of claim 1, wherein the channels are made by means of laser ablation.

5. The method of claim 1, wherein the structure of channels is made by means of photoforming.

6. The method of claim 1, wherein the conductive structures are made of platinum layers transparent for gases.

7. The method of claim 1, wherein the conductive structures are made of nickel nanotubes.

8. The method of claim 1, wherein the conductive structures are made of nickel meshes.

* * * * *